United States Patent [19]

Lamb

[11] 4,222,451
[45] Sep. 16, 1980

[54] TILTING CAB FOR VANS

[76] Inventor: Charles A. Lamb, 519 1/2 W. Thurber, Tucson, Ariz. 85705

[21] Appl. No.: 953,908

[22] Filed: Oct. 23, 1978

[51] Int. Cl.² .............................................. B62D 33/06
[52] U.S. Cl. .................................. 180/89.18; 296/190
[58] Field of Search ............... 180/89.13, 89.14, 89.17, 180/89.18; 296/190, 35 R

[56] References Cited

U.S. PATENT DOCUMENTS

| | | | |
|---|---|---|---|
| 3,391,811 | 7/1968 | Barnes | 180/89.13 |
| 4,121,684 | 10/1978 | Stephens | 180/89.14 |

Primary Examiner—John J. Love
Assistant Examiner—John A. Carroll
Attorney, Agent, or Firm—Cahill, Sutton & Thomas

[57] ABSTRACT

A forward tilting cab is provided on a van having a unitary interior volume containing a cab compartment and a rear compartment for cargo or passengers and an engine compartment extending substantially into the cab compartment. The forward tilting cab is attached to an engine compartment cover which is raised to expose the engine of the van when the cab is tilted forward, thereby providing easy access to the engine to facilitate repairs and servicing of the engine.

6 Claims, 6 Drawing Figures

TILTING CAB FOR VANS

BACKGROUND OF THE INVENTION

1. Field of the Invention

The invention relates to forward tilting cabs for small vans having an engine compartment extending into a cab compartment of the van.

2. Description of the Prior Art

Small vans of the type having a unitary interior volume including both a cab compartment and a van cargo or passenger compartment are very popular for both recreational and commercial purposes. Such vans are commonly constructed on half-ton or three-quarter ton chassis, and commonly have an engine compartment extending partly or completely into the cab compartment of the van. An engine cover fastened to the cab floor includes a top firewall and lateral side firewalls isolating and insulating the cab compartment from engine noise, heat, and fumes. Such vans are popular for a number of reasons, including the comparatively large amount of space therein, considering the relatively short wheelbase of such vehicles. Such vans are commonly powered by large six cylinder or eight cylinder engines which are compactly fitted into the engine compartments. Frequently, power steering pumps, power brake system elements, and air conditioning compressors and associated electrical wiring and fluid hoses are also compactly installed within the engine compartments. Repair and maintenance operations on the engine and other accessories mounted in the engine compartments of small vans can only be performed after the firewall panels of the engine cover are removed. Unfortunately, a considerable amount of labor (frequently more than an hour) is required simply to remove the engine cover so that the mechanic can gain access to the engine and associated equipment. Even then, the engine and various associated devices are very difficult for a mechanic to work on due to the cramped conditions in the engine compartment and cab compartment. Special precautions need to be taken to avoid soiling the upholstery, carpeting, etc., in the cab compartment. Consequently, repair and maintenance costs for such vans are excessively high. For commercial owners of vans, including owners of large fleets of vehicles of various kinds who employ mechanics to service their vehicles, van repair costs are needlessly high for a number of reasons. Approximately an hour is often required simply to remove the engine cover in order to enable a mechanic to begin to perform maintenance and repair operations on the engine and engine driven accessory units located in the engine compartment. Because of the cramped and uncomfortable working conditions in the cab compartments and engine compartments of prior vans, fleet mechanics frequently postpone working on such vans until all other vehicles in the motor pool have been serviced. Therefore, the percentage of vans inoperative at any given time is likely to be substantially higher than for other vehicles of the fleet. These factors alone represent significant additional maintenance costs for small vans compared to other vehicles.

As to private owners of vans, the difficulties of accessing the engine compartment of present vans tends to discourage private owners from performing even simple tune-up tasks, and increases the costs of having professional mechanics perform such tasks. There is clearly a need for a van having all of the advantages which have made vans highly popular yet also having an easily accessible engine compartment.

It is therefore a primary object of this invention to provide a van of the type having a unitary interior volume including a rear passenger or cargo compartment, a cab compartment, and an easily accessible engine compartment extending into the cab compartment.

U.S. Pat. Nos. 2,746,267 and 3,380,773 disclose large trucks having tilt forward cabs located over their engines. However, the cab compartments of the disclosed forward tilting cabs are not contained within a unitary interior volume containing a rear cargo or passenger area. The disclosed trucks clearly do not have the various features which have made small vans so popular in recent years.

U.S. Pat. No. 2,141,267 discloses a van having a unitary interior volume containing both a cab compartment and a rear cargo or passenger compartment wherein the entire van body, including the cab compartment, the cargo or passenger compartment, and the floors of both the cab and cargo compartments extending are raised to expose an interior engine compartment extending into the cab compartment. However, this system requires an expensive, unwieldy system capable of raising the entire body of the van and any cargo therein.

SUMMARY OF THE INVENTION

Briefly described, and in accordance with one embodiment thereof, the invention provides a tilting cab for a van having a unitary interior volume containing a cab compartment and a rear compartment for cargo or passengers, wherein an engine compartment cover housing an engine of the van extends substantially into the cab compartment. A dashboard and the engine cover insulating the cab compartment fron engine noise, heat, and fumes from the engine compartment, are connected to the tilting cab and are raised as the cab is tilted forward, exposing the engine and various associated apparatus to enable a mechanic to easily and conveniently service and repair the engine and associated apparatus.

In the described embodiment of the invention, the floor of the cab compartment and the front seats of the van remain connected to a van chassis frame when the cab is tilted forward. When the cab is in its normal (or lowered) position, the cab and a main body section of the van covering the rear compartment are clamped and sealed together by means of a plurality of clamping devices and by means of a sealing gasket disposed between a surface of a first U-shaped brace attached to the most forward side and roof portions of the main body section of the van and a second U-shaped brace attached to the most rearward positions of the roof and sides of the cab. The first and second U-shaped braces each have a corresponding sloped face, respectively, lying in a separate plane through a plurality of pivot points connected to the van chassis. The cab tilts about the pivot points when tilted forward to expose the engine and associated apparatus in the engine compartment. The flexible gasket is disposed between the two sloped faces when the cab and main body are clamped together during normal operation of the van. An automatic lifting apparatus connected between the chassis frame and the cab permits a user to tilt the cab forward.

In one embodiment of the invention, a foot stirrup attached to the lower forward exterior portion of the cab and an exterior handle located immediately below the windshield permit a user in front of the cab to manually tilt the cab forward.

DESCRIPTION OF THE INVENTION

Figure 1:
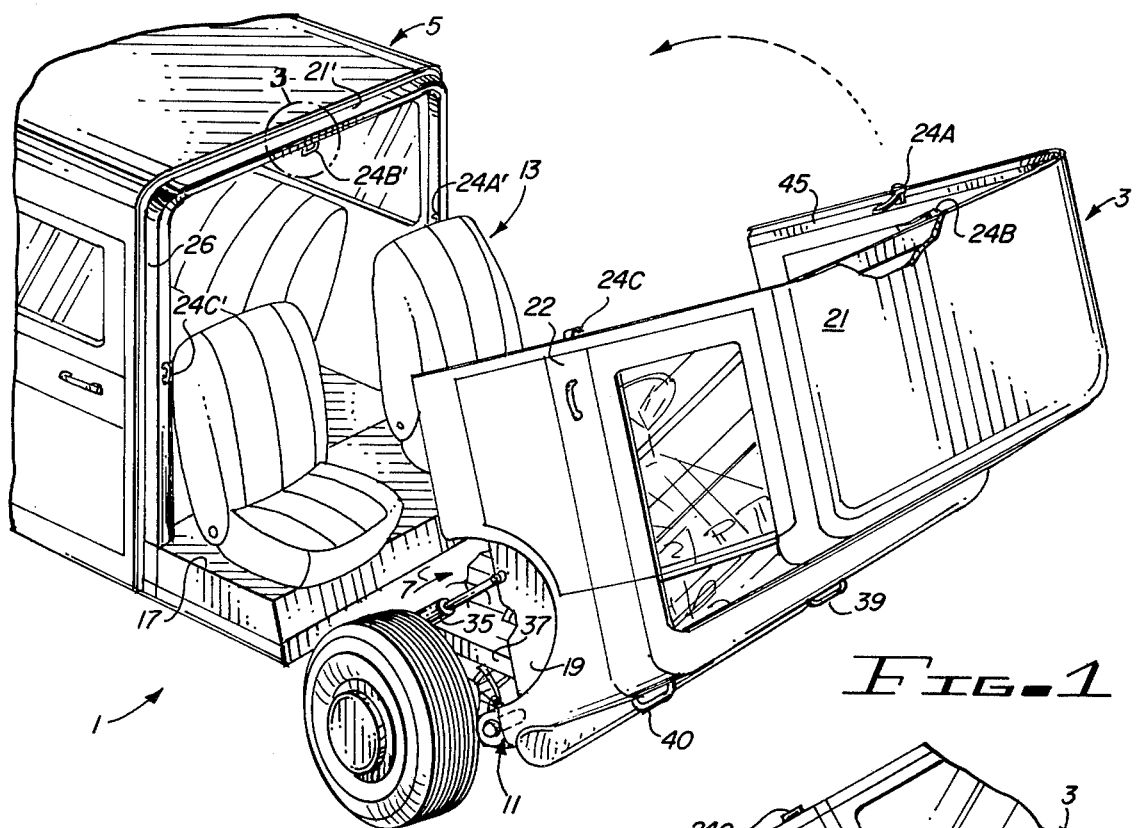
FIG. 1 is a perspective view of a van having a tilt forward cab exposing an engine compartment of the van.

Referring to FIG. 1, van 1 includes a "tilt forward" cab which partially encloses a cab compartment when the cab is in its "normal" or lowered configuration. Van 1 also includes a main body 5 enclosing a rear passenger or cargo compartment. The term "cab compartment" as used herein is intended to include those parts of the volume bounded by a cab which are located rearward of an imaginary vertical line passing through the most forward portion of the windshield of the van.

Figure 2:
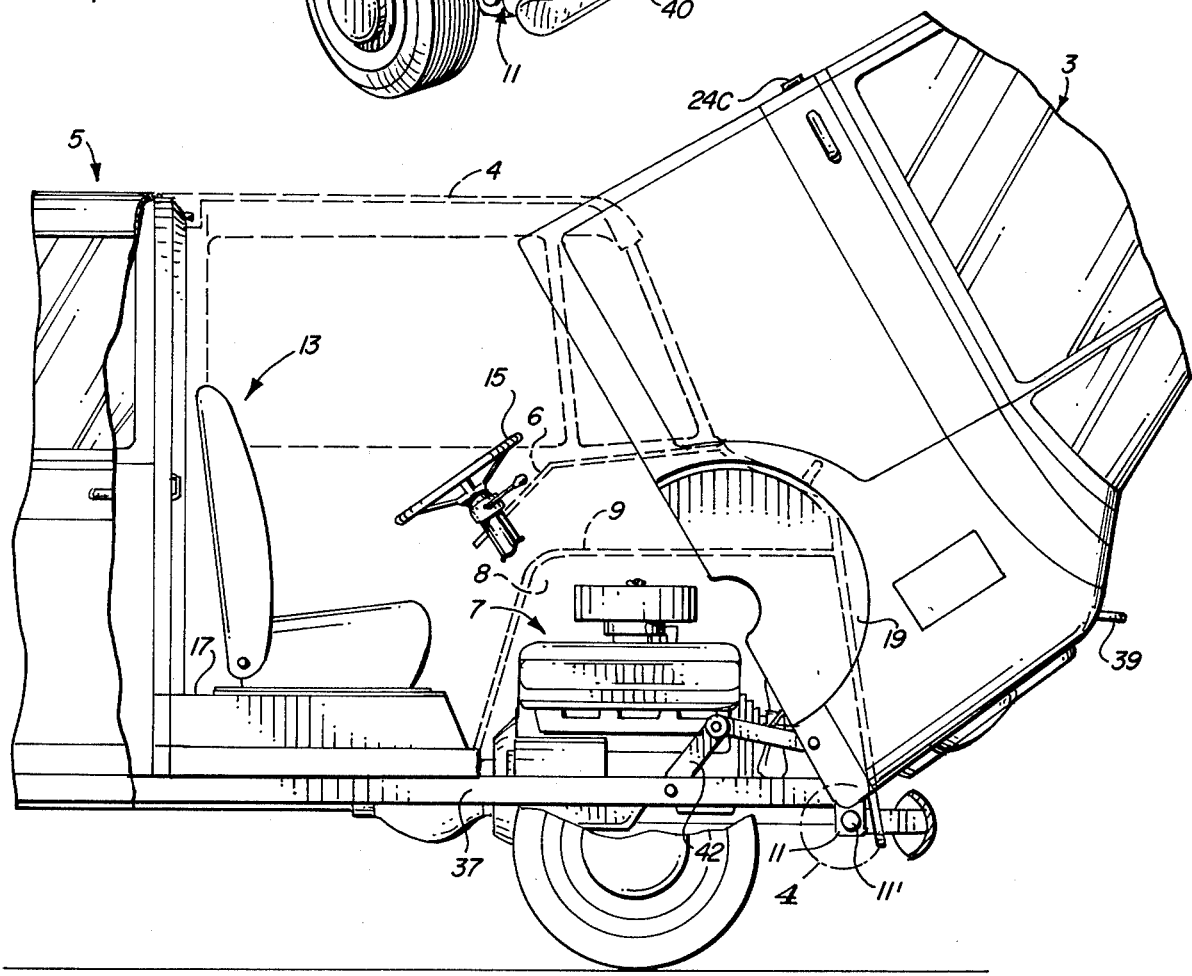
FIG. 2 is a side view illustrating the van of FIG. 1 with its cab in normal and tilted positions.

The "normal" cab position is indicated by dotted lines 4 in FIG. 2, which dotted lines show the shape of cab 3 when in its lowered position. The cab compartment contains two seats 13 mounted on cab floor 17. Cab floor 17 is attached to chassis frame member 37. Seats 13 therefore are not raised as cab 3 is tilted forward. Steering wheel 15 and various other controls (not shown) including a shifting lever, clutch, brake, and accelerator controls omitted from the drawings are also contained in the cab compartment of FIGS. 1 and 2.

An engine cover 9 and a dashboard 6 are connected to the interior of cab 3. Engine cover 9 includes a top and sides forming firewalls bounding engine compartment 8 (see FIG. 2). Engine compartment 8 extends substantially into the cab compartment, as clearly seen in FIG. 2. When cab 3 is tilted forward by pivoting it about pivot point 11' of pivot bearing 11, engine cover 9 and dashboard 6 are correspondingly raised and tilted forward, thereby exposing engine 7. Folding lever assembly 42 (shown in FIG. 2 but omitted from FIG. 1 for convenience) limits the extent of forward tilting of cab 3 and provides support maintaining cab 3 in its raised configuration. With engine cover 9 and dashboard 6 raised high above engine compartment 8, a mechanic can easily reach engine 7 and associated apparatus such as air conditioning compressors and the like from either side of van 1. This greatly facilitates performance of maintenance and repair operations on the engine and associated apparatus of van 1 compared to previously known vans, wherein an engine housing usually needs to be removed before most repair or maintenance operations on the engine can be performed. It is also noteworthy that there is no need for a mechanic to lean over front wheel housing 19 or seats 13 in order to reach various portions of engine 7; he can easily reach engine 7 from a position along the side of van 1.

It should be noted that hydraulic cylinder 35 (shown in FIG. 1 but omitted from FIG. 2 for clarity) is actuatable by a control (not shown) to raise cab 3 and tilt it forward as shown in FIGS. 1 and 2 (alternatively, one skilled in the art could readily provide an electric apparatus for automatically raising cab 3 in response to a control switch). Cab 3 can also be raised and tilted forward by means of stirrup 40 and handle 39; an average sized person can, by putting one foot in stirrup 40 and grasping handle 39 with one or both hands, place all of his weight on stirrup 40, lean backward, and pull forward on handle 39, causing cab 3 to be tilted forward, thereby exposing engine 7, as previously explained.

When cab 3 is in its lowered or normal position, as indicated by dotted lines 4 in FIG. 2, cab 3 is fastened to the main body 5 by means of latching devices 24A, 24B and 24C. Latching devices 24A, 24B and 24C are securely mounted on a U-shaped brace 45, to which the roof and sides of cab 3 are attached. Each of latching devices 24A, 24B and 24C has an extendible and retractable hooked tongue which engages a tongue-receiving device rigidly attached to U-shaped frame member 26, to which the sides and roof of main body 5 are securely attached. More particularly, the hooked tongues of latching devices 24A, 24B and 24C engage tongue-receiving devices 24A', 24B' and 24C' shown in FIG. 1.

Figure 3:
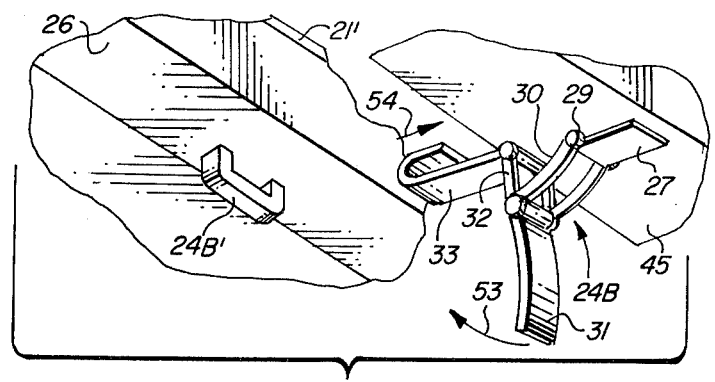
FIG. 3 is a drawing illustrating a clamping mechanism utilized to clamp the cab and main body together for normal operation of the van of FIG. 1.

The details of a latching device and corresponding tongue receiving device are shown in FIG. 3 wherein latching device 24B is attached to the lower side of the upper portion of U-shaped brace 45 by means of plate 27. Latching device 24B includes hooked tongue 33, which is hingeably connected to a lever arm 32. Lever arm 32 is rigidly connected to handle 31. Handle 31 is hingeably connected to lever arm 30. Lever arm 30 is hingeably connected to plate 27, as shown.

Figure 6:
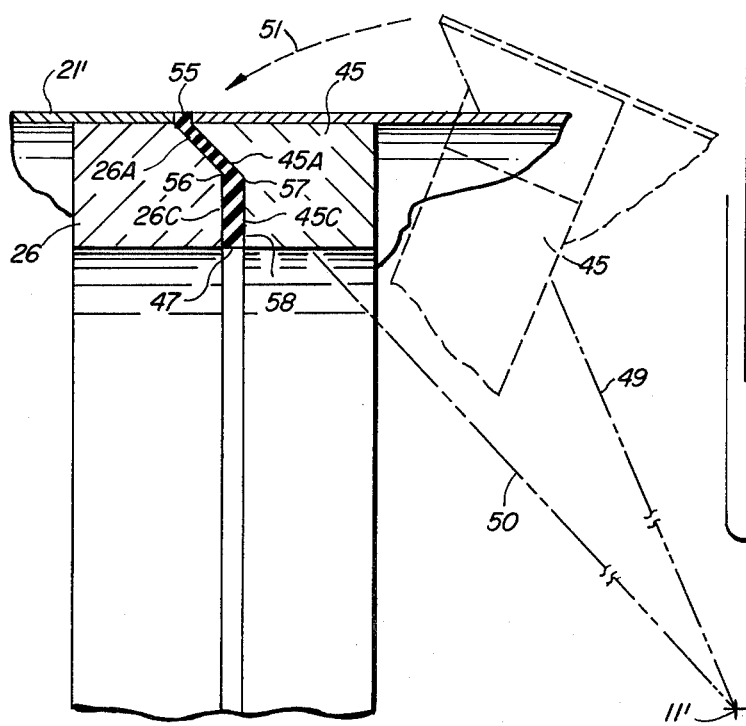
FIG. 6 is a partial sectional view taken along section lines 6—6 of FIG. 6.

At this point, it should be noted that as cab 3 is in its lowered position, U-shaped braces 45 move into contact with sealing strip 47, which is attached to U-shaped brace 26, as shown in FIG. 6. Sealing strip 47 serves as a gasket between contacting surfaces of U-shaped braces 26 and 45. With this in mind, the operation of latching device 24B is as follows. When handle 31 is moved in a direction opposite to arrow 53 in FIG. 3, hooked tongue 33 moves in the direction opposite to the direction of arrow 54 such that the hooked portion of tongue 33 can enter the hole in tongue receiving device 24B'. Handle 31 is then moved in the direction of arrow 53, causing hook shaped tongue 33 to move in the direction of arrow 54. Handle 31 is moved until it lies approximately flat against the ceiling of the van, drawing U-shaped braces 26 and 45 tightly together. Latching devices 24A and 24C are deployed similarly, tightly engaging cab 3 to main body 5.

Figure 5:
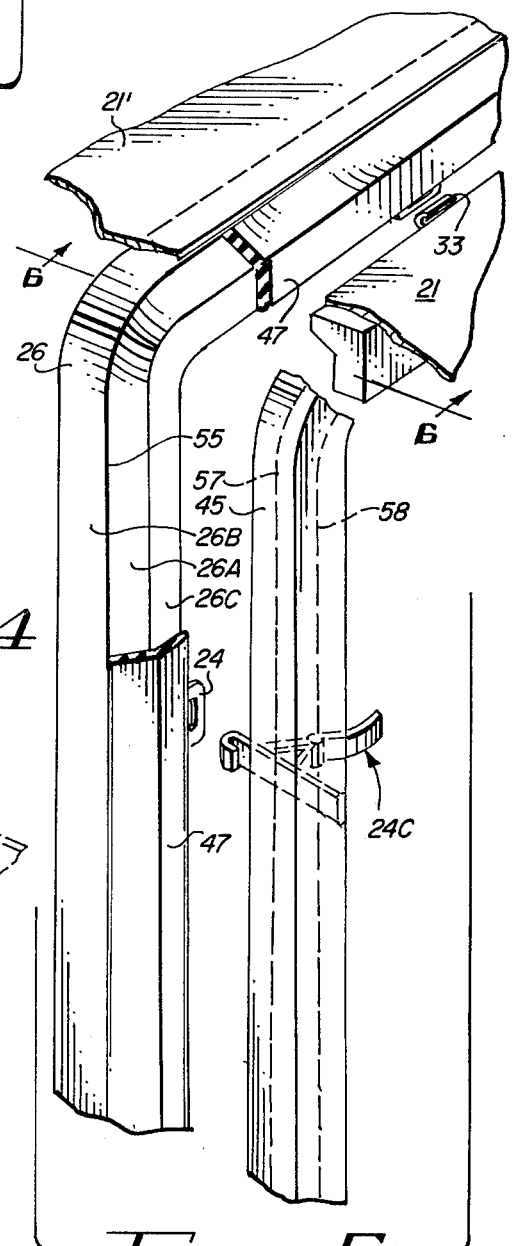
FIG. 5 is a diagram illustrating U-shaped braces supporting the side and roof of the main body portion and cab portion of the van of FIG. 1.

As best shown in FIGS. 5 and 6, U-shaped braces 26 and 45 have opposed mating surfaces which greatly increase the rigidity of the engagement between cab 3 and main body 5 when latching devices 24A, 24B, and 24C are locked. More particularly, U-shaped brace 26 has a sloped surface 26A and U-shaped brace 45 has a sloped surface 45A which mates with sloped surface 26A of U-shaped brace 26. Sloped surface 26A extends between edges 55 and 56 of U-shaped brace 26. Rubber strip 47 is securely attached to sloped surface 26A and vertical surface 26C of U-shaped brace 26. When latching devices 24A, 24B and 24C are locked, sloped surface 45A and vertical surface 45C of U-shaped brace 45 are pressed tightly against the corresponding surfaces of rubber strip 47, thereby increasing the structural rigidity of the engagement between U-shaped braces 26 and 45.

In FIG. 6, it is seen that sloped surfaces 26A and 45A lie in planes which pass through pivot point 11', about which cab 3 pivots when it is tilted forward; thus, when cab 3 is being lowered, U-shaped brace 45 moves in the direction indicated by arrow 51, causing sloped surface 45A to contact a portion of rubber strip 47 parallel to sloped surface 26A with a minimum of sliding. However, one could readily use a different, non-planar configuration of mating surfaces for U-shaped braces 26 and 45 to achieve yet greater rigidity of coupling between U-shaped braces 26 and 45 when cab 3 is locked to main body 5, as previously described. However, an increased amount of friction between the mating surfaces would occur as the latching devices were engaged.

Figure 4:
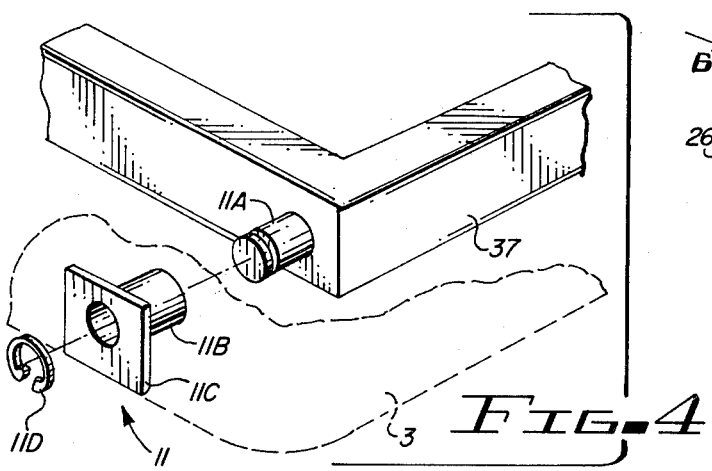
FIG. 4 is a partial perspective view illustrating the bearing assembly about which the cab of FIG. 1 pivots.

Details of one of pivot bearings 11 about which cab 3 pivots are shown in FIG. 4, wherein a shaft 11A is rigidly attached to a portion of frame 37. A sleeve bearing 11B attached rigidly to plate 11C rotates on shaft 11A. Plate 11C is welded to the interior of cab 3, indicated by the dotted lines in FIG. 4. A retaining clip 11E engages a groove disposed at the end of shaft 11A. A similar pivot bearing arrangement is provided on a symmetrically opposed side of frame 37.

The above-described tilt forward cab greatly reduces the amount of time required for a mechanic to gain access to the engine of a van having an engine compartment extending into the cab compartment, since the special operations of removing the engine cover are no longer required, as for previous vans. With the cab in the forward tilted configuration, the entire engine can be easily reached by a mechanic positioned on either side of the van. Further, it is not necessary for the mechanic to work within areas in the cab compartment as in previous vans. Engine repair and maintenance tasks for vans are more easily accomplished for the vans of the present invention. Further, the need to take special precautions to protect upholstery and interior finishings of the van are obviated.

Although the invention has been described with reference to a particular embodiment thereof, those skilled in the art may make various modifications to the described embodiment without departing from the true spirit and scope of the present invention, which is intended to be limited only with reference to the following claims.

I claim:

1. A van body for a van having a unitary interior volume including a rear compartment for cargo or passengers and a cab compartment for a driver, said van having an engine compartment housing an engine cover extending into said cab compartment and isolating said cab compartment from said engine compartment during normal operation of said van, said van body comprising in combination:
   a. a rear body section containing said rear compartment, said rear body section being rigidly attached to a chassis frame of said van;
   b. a cab section pivotable forward from a lowered position to a forward tilted position to expose the interior of said cab compartment and said engine compartment to facilitate engine maintenance and repairs and pivotable rearward from said forward tilted position to said lowered position to sealingly engage said rear body section;
   c. pivot means attached to said chassis frame for pivotally connecting said cab to said chassis frame;
   d. an engine cover connected to said cab section for isolating said engine compartment from said cab compartment when said cab section is in said lowered position and exposing said engine compartment to said cab compartment when said cab section is in said forward tilted position
   e. fastening means for securely fastening said cab section to said main body section; and
   f. a first U-shaped brace attached to a forward portion of said main body section and a second U-shaped brace attached to a rearward portion of said cab section, said fastening means being operable to draw said second U-shaped brace against said first U-shaped base.

2. The van body of claim 1 wherein said first and said second U-shaped braces have first and second mating surfaces, respectively, said van body further including sealing means disposed on one of said mating surfaces for resiliently and sealingly contacting the other of said mating surfaces when said fastening means is engaged to securely fasten said cab section to said main body section.

3. The van body of claim 1 wherein said engine cover is directly attached to the interior of said cab section so that said engine cover is lifted to expose said engine when said cab section is pivoted forward.

4. The van body of claim 1 further including:
   a. means connected to a chassis frame of said van and said cab section for holding said cab section in said forward tilted position; and
   b. means for raising said cab section from said lowered position to said forward tilted position.

5. The van body of claim 4 wherein said raising means includes an exterior handle attached to said cab section immediately below a windshield of said cab section and an exterior stirrup attached to a lower front portion of said van section beneath said exterior handle.

6. The van body of claim 4 when said first and second mating surfaces have substantially sloped flat portions.

* * * * *